(12) United States Patent
Brothers et al.

(10) Patent No.: US 11,244,225 B2
(45) Date of Patent: Feb. 8, 2022

(54) NEURAL NETWORK PROCESSOR CONFIGURABLE USING MACRO INSTRUCTIONS

(71) Applicant: Samsung Electronics Co., Ltd., Gyeonggi-Do (KR)

(72) Inventors: John W. Brothers, Calistoga, CA (US); Joohoon Lee, East Palo Alto, CA (US)

(73) Assignee: SAMSUNG ELECTRONICS CO., LTD.

( * ) Notice: Subject to any disclaimer, the term of this patent is extended or adjusted under 35 U.S.C. 154(b) by 844 days.

(21) Appl. No.: 15/193,741

(22) Filed: Jun. 27, 2016

(65) Prior Publication Data
US 2017/0011288 A1    Jan. 12, 2017

Related U.S. Application Data

(60) Provisional application No. 62/191,266, filed on Jul. 10, 2015.

(51) Int. Cl.
*G06N 3/063* (2006.01)
*G06F 9/30* (2018.01)

(52) U.S. Cl.
CPC ........... *G06N 3/063* (2013.01); *G06F 9/3017* (2013.01); *G06F 9/30036* (2013.01)

(58) Field of Classification Search
CPC ............................ G06F 9/30036; G06N 3/063
See application file for complete search history.

(56) References Cited

U.S. PATENT DOCUMENTS

| 5,091,864 | A | | 2/1992 | Baji et al. | |
|---|---|---|---|---|---|
| 5,208,900 | A | * | 5/1993 | Gardner | G06N 3/063 706/42 |
| 5,778,153 | A | * | 7/1998 | Wang | G06N 3/063 706/26 |
| 6,125,194 | A | * | 9/2000 | Yeh | G06F 19/321 382/132 |
| 6,549,646 | B1 | * | 4/2003 | Yeh | G06K 9/6814 382/132 |
| 8,301,963 | B2 | | 10/2012 | Hou et al. | |
| 8,468,109 | B2 | | 6/2013 | Moussa et al. | |

(Continued)

OTHER PUBLICATIONS

Jackel, L.D. et al. (1990). "Hardware requirements for neural-net optical character recognition." 1990 IJCNN International Joint Conference on Neural Networks. IEEE, 1990. (Year: 1990).*
Han, S. et al. (Feb. 15, 2016). "Deep Compression: Compressing Deep Neural Networks With Pruning, Trained Quantization and Huffman Coding". Published as a conference paper at ICLR 2016. 14 pages. arXiv: 1510.00149v5 (Year: 2016).*

(Continued)

*Primary Examiner* — Kamran Afshar
*Assistant Examiner* — Benjamin J Buss
(74) *Attorney, Agent, or Firm* — Renaissance IP Law Group LLP

(57) ABSTRACT

Implementing a neural network can include receiving a macro instruction for implementing the neural network within a control unit of a neural network processor. The macro instruction can indicate a first data set, a second data set, a macro operation for the neural network, and a mode of operation for performing the macro operation. The macro operation can be automatically initiated using a processing unit of the neural network processor by applying the second data set to the first data set based on the mode of operation.

16 Claims, 11 Drawing Sheets

(56) References Cited

U.S. PATENT DOCUMENTS

| | | | |
|---|---|---|---|
| 9,263,036 B1* | 2/2016 | Graves | G10L 15/16 |
| 9,645,974 B1* | 5/2017 | Patil | G06F 17/16 |
| 2003/0174881 A1* | 9/2003 | Simard | G06K 9/4628 |
| | | | 382/159 |
| 2007/0022063 A1 | 1/2007 | Lightowler | |
| 2007/0288668 A1* | 12/2007 | Fiske | G06F 15/163 |
| | | | 710/100 |
| 2008/0025610 A1* | 1/2008 | Abdulkader | G06K 9/00852 |
| | | | 382/185 |
| 2008/0319933 A1 | 12/2008 | Moussa et al. | |
| 2010/0076915 A1 | 3/2010 | Xu et al. | |
| 2011/0029471 A1* | 2/2011 | Chakradhar | G06N 3/063 |
| | | | 706/25 |
| 2012/0166374 A1 | 6/2012 | Moussa et al. | |
| 2014/0279771 A1* | 9/2014 | Golovashkin | G06N 3/04 |
| | | | 706/16 |
| 2014/0280430 A1 | 9/2014 | Kim | |
| 2014/0365548 A1 | 12/2014 | Mortensen | |
| 2015/0036920 A1* | 2/2015 | Wu | G06K 9/6272 |
| | | | 382/156 |
| 2015/0170021 A1 | 6/2015 | Lupon et al. | |
| 2015/0178246 A1 | 6/2015 | Herrero Abellanas et al. | |
| 2015/0199963 A1 | 7/2015 | Maaninen | |
| 2016/0350649 A1* | 12/2016 | Zhang | G06N 3/0454 |
| 2017/0011288 A1* | 1/2017 | Brothers | G06F 9/3017 |
| 2017/0193361 A1* | 7/2017 | Chilimbi | G06N 3/084 |

OTHER PUBLICATIONS

Hegde, K. et al. (2018). "Ucnn: Exploiting computational reuse in deep neural networks via weight repetition." 2018 ACM/IEEE 45th Annual International Symposium on Computer Architecture (ISCA). IEEE, 2018. (Year: 2018).*

Definition of "macro". IEEE 100: The Authoritative Dictionary of IEEE Standards Terms, Seventh Edition. 2000. p. 650. (Year: 2000).*

Definition of "macro". Microsoft Computer Dictionary, Fifth Edition. 2002. p. 323. (Year: 2002).*

Definition of "macro". The American Heritage College Dictionary, Fourth Edition. 2004. p. 829. (Year: 2004).*

Deka, B., "Towards a Low Power Hardware Accelerator for Deep Neural Networks," [online] Univ. of Illinois at Urbana Champaign, Fall 2013 [retrieved Jun. 20, 2016] retrieved from the Internet: <https://www.semanticscholar.org/paper/Towards-a-Low-Power-Hardware-Accelerator-for-Deep-Deka/c1e67c1540ba9b73b280b812e4a2c40806b92231/pdf>, 7 pg.

Farabet, C. et al., "Hardware Accelerated Convolutional Neural Networks for Synthetic Vision Systems," In Proc. of 2010 IEEE Int'l. Sym. on Circuits and Systems, pp. 257-260, 2010.

"Optimizing FPGA-based Accelerator Design for Deep Convolutional Neural Networks" In Proc. of 2015 ACM/SIGDA Int'l. Sym. on Field-Programmable Gate Arrays, pp. 161-170, 2015.

* cited by examiner $$M_0 = \begin{bmatrix} A & B & C \\ D & E & F \\ 0 & A & 0 \end{bmatrix} \quad M_1 = \begin{bmatrix} G & H & C \\ I & G & J \\ 0 & K & A \end{bmatrix}$$

Convert to Execution Table ↓

| Step # | Value | X Offset | Y Offset | Apply Weight | Input FM Select | Output FM Select |
|---|---|---|---|---|---|---|
| 0 | A | 0 | 0 | 1 | 0 | 0 |
|   | A | 1 | 2 | 0 | 0 | 0 |
| 1 | A | 2 | 2 | 0 | 0 | 1 |
|   | B | 1 | 0 | 1 | 0 | 0 |
| 2 | C | 2 | 0 | 1 | 0 | 0 |
|   | D | 0 | 1 | 1 | 0 | 0 |
| 3 | E | 1 | 1 | 1 | 0 | 0 |
|   | F | 2 | 1 | 1 | 0 | 0 |
| 4 | G | 0 | 0 | 1 | 0 | 1 |
|   | G | 1 | 1 | 0 | 0 | 1 |
| 5 | H | 1 | 0 | 0 | 0 | 1 |
|   | I | 0 | 1 | 1 | 0 | 1 |
| 6 | J | 2 | 1 | 1 | 0 | 1 |
|   | K | 1 | 2 | 1 | 0 | 1 |

FIG. 10

NEURAL NETWORK PROCESSOR CONFIGURABLE USING MACRO INSTRUCTIONS

CROSS-REFERENCE TO RELATED APPLICATIONS

This application claims the benefit of U.S. Provisional Patent Application No. 62/191,266 filed on Jul. 10, 2015, which is fully incorporated herein by reference.

TECHNICAL FIELD

This disclosure relates to neural networks. More particularly, this disclosure relates to a neural network processor for executing a neural network.

BACKGROUND

Neural networks refer to a computational architecture modeled after biological brains. Within a neural network, nodes referred to as neurons may be interconnected and operate collectively to process complex input data. Examples of different types of neural networks include, but are not limited to, Convolutional Neural Networks, Recurrent Neural Networks, Deep Belief Networks, Restricted Boltzman Machines, etc. In a feed-forward neural network, the neurons of the neural network have links to other neurons. The links only extend in one direction, i.e., the forward direction, through the neural network.

A neural network may be used to extract "features" from complex input data. The neural network may include a plurality of layers. Each layer may receive input data and generate output data by processing the input data to the layer. The output data may be a feature map of the input data that the neural network generates by convolving an input image or a feature map with convolution kernels. Initial layers of a neural network, e.g., convolution layers, may be operative to extract low level features such as edges and/or gradients from an input such as an image. The initial layers of a neural network are also called feature extraction layers. Subsequent layers of the neural network, referred to as feature classification layers, may extract or detect progressively more complex features such as eyes, a nose, or the like. Feature classification layers are also referred to as "fully-connected layers."

SUMMARY

One or more embodiments include a method. The method includes receiving a macro instruction for implementing a neural network within a control unit of a neural network processor. The macro instruction indicates a first data set, a second data set, a macro operation for the neural network, and a mode of operation for performing the macro operation. The method also includes automatically initiating the macro operation using a processing unit of the neural network processor by applying the second data set to the first data set based on the mode of operation.

One or more other embodiments include an apparatus. The apparatus includes a control unit configured to receive a macro instruction. The macro instruction indicates a first data set, a second data set, a macro operation for the neural network, and a mode of operation for performing the macro operation. The apparatus includes a memory unit coupled to the control unit. The memory unit is configured to store the data sets. The apparatus also includes a processing unit coupled to the memory unit. The processing unit is configured to automatically initiate the macro operation by applying the second data set to the first data set based on the mode of operation.

One or more other embodiments include a computer program product including a computer readable storage medium having program code stored thereon. The program code is executable by a processor to receive a macro instruction for implementing a neural network. The macro instruction indicates a first data set, a second data set, a macro operation for the neural network, and a mode of operation for performing the macro operation. The program code is further executable by the processor to automatically initiate the macro operation by applying the second data set to the first data set based on the mode of operation.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

FIGS. 4-1 and 4-2, taken collectively, illustrate an example of a processing unit for a neural network processor.

FIG. 10 illustrates an example of an execution table for a matrix multiply unit.

DETAILED DESCRIPTION

Figure 1:
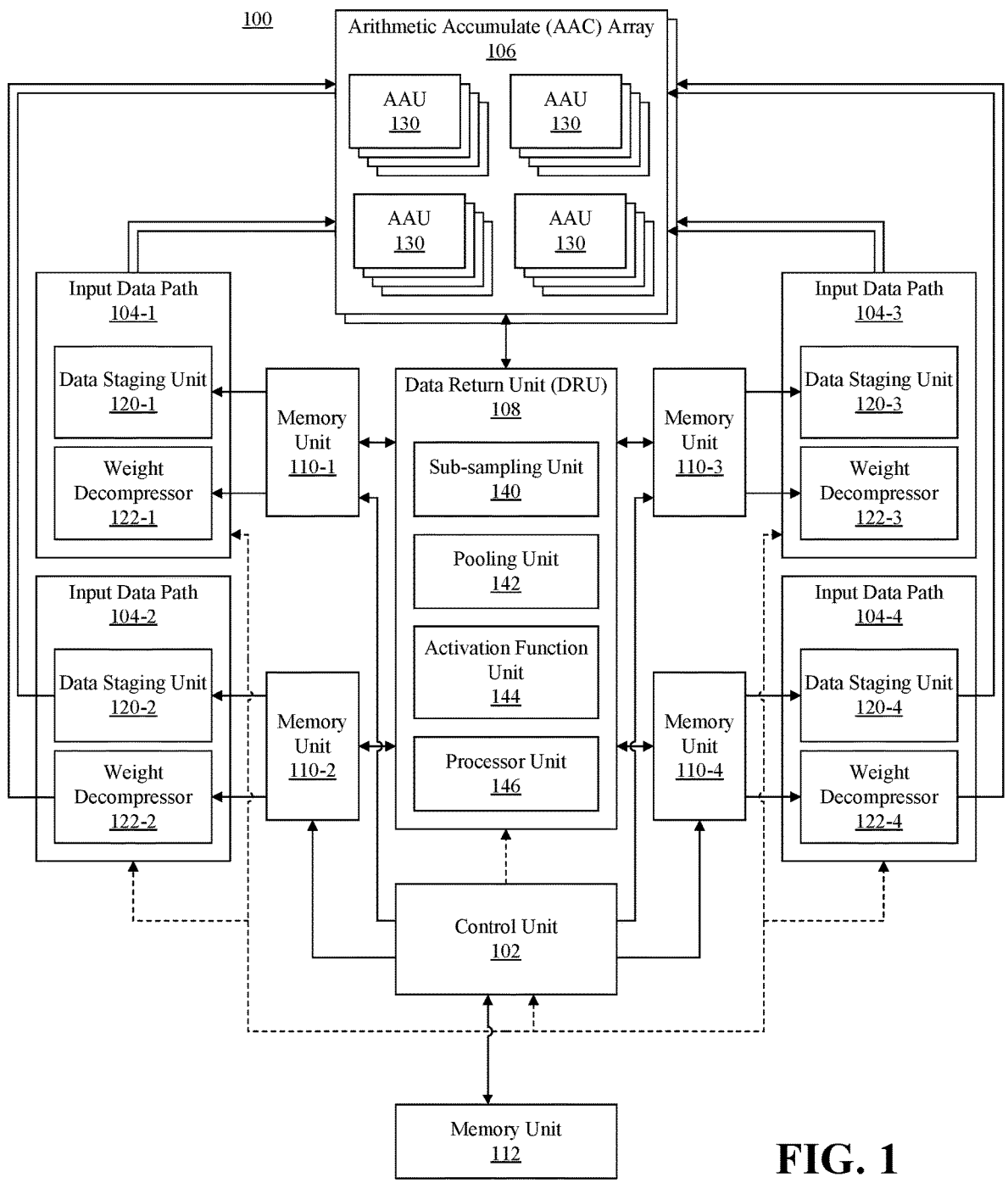
FIG. 1 is a block diagram illustrating an example of a neural network processor.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to neural networks, among other aspects of numerical computation methods and devices. Example embodiments described within this disclosure relate to a neural network processor (hereafter an "NN processor") that is capable of executing and/or implementing the neural network. In accordance with example embodiments disclosed herein, a computer-based utility is capable of processing a description, e.g., a programmatic description, of a neural network to generate a sequence of instructions. The instructions generated may be provided to an NN processor for execution. The NN processor, in executing the instructions, implements, or executes, the neural network. The NN processor, for example, is capable of parsing the instructions and controlling operation of one or more processing units included within the NN processor to execute the neural network. While example embodiments herein are described in the context of neural network processing, it will be appreciated that neural networks are used for illustration purposes only and the disclosure can be applied to any suitable application, such as vector or matrix processing, in example embodiments.

In one or more example embodiments, the instructions are implemented as macro instructions. A macro instruction, when executed by the NN processor, causes one or more of the processing units within the NN processor to perform a macro operation. A macro operation, for example, is a plurality of lower level operations performed by one or more processing units of the NN processor over multiple clock cycles. A macro instruction can correspond to an instruction that implements a category or portion of neural network processing.

By executing a single macro instruction, the NN processor is capable of implementing complex operations that may occur over many cycles. For example, the NN processor may execute macro instructions directed to categories of neural network execution such as performing convolution, determining vector products, performing pooling, performing sub-sampling, evaluating gates of Long Short Term Memory (LSTM) cells, and moving data into, out from, and/or within the NN processor. The macro instructions allow the NN processor to operate at a higher level as opposed to utilizing one instruction for each individual add, multiply, or other lower level operation.

One or more other embodiments provide a power and performance-optimized matrix multiply unit targeting neural network feature extraction. One or more other embodiments are applicable to feature classification layers of neural networks as well as general filtering operations applied to images, video, audio, and other data as part of more general computer vision and/or audio processing where data is filtered through matrix multiplies (e.g., convolutions).

In one or more other embodiments, the instructions are implemented as low level instructions. The low level instructions may be provided to a matrix multiply unit for processing input feature maps efficiently. As executed by a matrix multiply unit, the low level instructions facilitate the generation of output feature maps from input feature maps in an efficient manner.

In one aspect, the instructions, whether low level or macro, may specify a particular mode of operation. The mode of operation may indicate how a particular operation is to be performed or implemented. As an illustrative and non-limiting example, a mode of operation for a convolution operation may indicate whether the convolution operation is to be performed using a scatter mode of operation or a gather mode of operation to be described herein in greater detail.

In one or more other embodiments, the NN processor, or portions thereof, is configured to operate in a log mode. In the log mode, values may be in, or converted into, a log number space (LNS) format as opposed to a linear format. By using LNS format for values, multiply operations may be transformed into addition operations for efficient processing. As such, multiply accumulate operations may be simplified into add accumulate operations, thereby simplifying the architecture of the NN processor and increasing operating speed and/or throughput of the NN processor.

In one or more other embodiments, variable precision of values is supported. Variable precision may be supported whether utilizing macro instructions or low level instructions. These and other aspects are described in greater detail below with reference to the drawings.

Within this disclosure, for purposes of illustration, control signals (e.g., conveyed physically on lines, wires, or wireless channels) are shown as dashed lines while data signals are shown as solid lines. Further, arrows generally indicate control flow between elements. In this regard, a signal with a directional arrow linking two or more elements still may represent bi-directional communication between the elements. Further, it will be appreciated that at least a portion of the control flow may be in a direction not indicated by the arrow.

FIG. 1 is a block diagram illustrating an example NN processor 100. NN processor 100 is capable of processing input feature maps by applying weights to generate output feature maps for feature extraction layers of a neural network. Further, NN processor 100 is capable of applying weights to values to implement feature classification layers of a neural network. In general, FIG. 1 illustrates an architecture configured for executing instructions, e.g., macro instructions. In response to execution of a macro instruction, NN processor 100 implements a macro operation. The macro operation is performed using one or more of the processing units of NN processor 100 described herein.

In one aspect, NN processor 100 is implemented as a semiconductor integrated circuit. Thus, each of the blocks shown in FIG. 1 represents circuitry of NN processor 100. In one example embodiment, NN processor 100 is implemented as a programmable integrated circuit such as a field programmable gate array. In other example embodiments, NN processor 100 is implemented as a custom integrated circuit or an application specific integrated circuit.

As pictured, NN processor 100 includes a control unit 102. Control unit 102 controls operation of processing units of NN processor 100. The processing units of NN processor 100 include input data paths 104 (e.g., 104-1, 104-2, 104-3, and 104-4), one or more arithmetic accumulate (AAC) arrays 106, and a data return unit (DRU) 108. NN processor 100 also includes memory units 110 (e.g., 110-1, 110-2, 110-3, and 110-4). Memory units 110 may be implemented as static random access memory (SRAM) units. FIG. 1 also shows a memory unit 112. Memory unit 112 may be implemented as a dynamic RAM (DRAM) unit. In one example embodiment, memory unit 112 is addressable by control unit 102, but is not implemented in the same substrate as NN processor 100. In this regard, memory unit 112 is an "off-chip" or "external" memory. By comparison, memory units 110 are "on-chip" or "internal" memories.

Control unit 102 controls operation of the processing units of NN processor 100 by way of the control signals shown. In one example embodiment, control unit 102 fetches one or more macro instructions from memory unit 112. Control unit 102 is capable of executing the macro instructions. In executing the macro instructions, control unit 102 generates the control signals. The control signals, which are distributed to the various elements of NN processor 100, cause the various processing units, e.g., input data paths 104, AAC arrays 106, and DRU 108 and/or portions thereof, to perform operations as described herein.

In one example implementation, macro instructions may be provided to processing units on a one-to-one basis. For example, a macro instruction is provided to at most one processing unit of NN processor 100. In another example implementation, one macro instruction may be provided to, and initiate operations in, more than one processing unit of NN processor 100.

Control unit 102 is also capable of fetching input data and weights from memory unit 112. The input data may be input feature maps or portions thereof called regions for implementing feature extraction layers of the neural network. The input data may be values for implementing feature classification layers of the neural network. The input data may also be intermediate data generated during implementation of feature extraction and/or feature classification layers. Control unit 102 is capable of storing the input data and weights within different ones of memory units 110. Input data paths 104, under control of control unit 102, read data from memory units 110 and provide the data, e.g., input data and weights, to AAC arrays 106.

As pictured, input data paths 104 include a data staging unit 120 and a weight decompressor 122. Data staging units 120 are configured to receive data, e.g., input data such as feature maps, values, and/or intermediate results, from memory units 110. Data staging units 120 are also configured to provide data obtained from memory units 110 to AAC arrays 106. Weight decompressor 122 is configured to decompress weights read from memory units 110 that are stored in compressed form. Weight decompressors 122 are capable of decompressing the weights read from memory units 110 and provide the decompressed weights to AAC arrays 106.

Each AAC array 106 includes a plurality of arithmetic accumulate units (AAUs) 130 that operate under control of control unit 102. In the example of FIG. 1, each AAC array 106 includes 16 AAUs 130. In the example of FIG. 1, NN processor 100 includes two instances of AAC array 106 as shown, with each AAC array 106 including 16 AAUs 130 capable of operating concurrently, e.g., in parallel. Results generated by AAC arrays 106 may be provided to DRU 108, also under control of control unit 102.

In one embodiment, AAC arrays 106 are configured to perform multiply accumulate (MAC) operations. In that case, each of AAUs 130 is implemented as a multiply accumulate unit (MAU). Each AAU 130, for example, is capable of multiplying received values and storing and/or accumulating the results of the multiplication internally. AAC arrays 106 are capable of performing convolution operations and vector product operations. Control unit 102, in executing macro instructions, causes input data and weights to be provided to AAC arrays 106 in different order to facilitate performance of convolution operations and/or vector products. In performing MAC operations, data utilized by AAC arrays 106 is specified in linear format. In one example embodiment, an implementation of component(s) for use in implementing AAC arrays 106 and/or AAUs 130 is described herein in connection with FIG. 9.

In another embodiment, where NN processor 102 is configured to operate in a log mode, AAC array 106 is configured to perform add accumulate operations. In that case, each of AAUs 130 is implemented as an add accumulate unit. Each AAU 130, for example, is capable of adding received values in LNS format and storing and/or accumulating the results of the additions internally in LNS format. In one example embodiment, an implementation of component(s) for use in implementing AAC arrays 106 and/or AAUs 130 is described herein in connection with FIGS. 7 and 8.

DRU 108 is coupled to AAC array 106 and memory units 110. DRU 108 is configured to perform a variety of operations. For example, DRU 108 is capable of saving and restoring AAC array 106 accumulator values for partially computed results, performing an initial clear of the accumulators in AAUs 130 to 0 or the bias values stored therein for a current output map. DRU 108 is capable of performing numerical format conversions, applying activation functions, performing pooling, performing sub-sampling, performing feature map reformatting, optionally performing compression, performing input stride data reformatting, generating addresses for reads and writes to memory units 110, performing feature map reordering and/or remapping, evaluating LSTM cells with corresponding updates to state and outputs in memory units 100, applying final Winograd transforms, and/or adding bias.

Referring to FIG. 1, DRU 108 includes a variety of subsystems including a sub-sampling unit 140, a pooling unit 142, an activation function unit (AFU) 144, and a processor unit 146. From time to time within this disclosure, the subsystems of DRU 108 may also be referred to as processing units. In any case, DRU 108 is capable of performing operations such as sub-sampling using sub-sampling unit 140, pooling using pooling unit 142, and applying an activation function using AFU 144. DRU 108 further includes a processor unit 146. In one example embodiment, processor 146 is capable of performing operations such as feature map reformatting, compression, input stride reformatting, generating addresses, performing feature map reordering and/or remapping, evaluating LSTM cells, applying final Winograd transforms, and/or applying bias.

DRU 108 operates under control of control unit 102. Further, each processing unit of DRU 108 is capable of operating under control of control unit 102. In general, DRU 108 receives accumulated data from AAC array 106, whether in linear format or in LNS format, and performs operations on the data based on control signals received from control unit 102 in executing macro instructions. In this regard, DRU 108 may be configured to operate in a linear mode of operation or may be configured to operate in a log mode of operation to match the particular configuration of AAC arrays 106. Any results generated by DRU 108 may be stored within memory units 110 for further processing. In one aspect, control unit 102 may instruct DRU 108 to store generated data within memory units 110 and then move the generated data from memory units 110 to memory unit 112. Example implementations for sub-sampling unit 140, pooling unit 142, and a processor unit 146 are described in greater detail in connection with FIGS. 4, 5, and 6 of this disclosure.

It should be appreciated that the architecture described with reference to FIG. 1 is provided for purposes of illustration only. The number of various units (e.g., memory units 110, AAC arrays 106, etc.) are not intended as limitations. NN processor 100 may include fewer or more of such processing units. Further, in some examples, one or more processing units may be combined into a single, larger processing unit. In other alternative examples, one or more individual processing units may be subdivided out into a plurality of smaller processing units.

Figure 2:
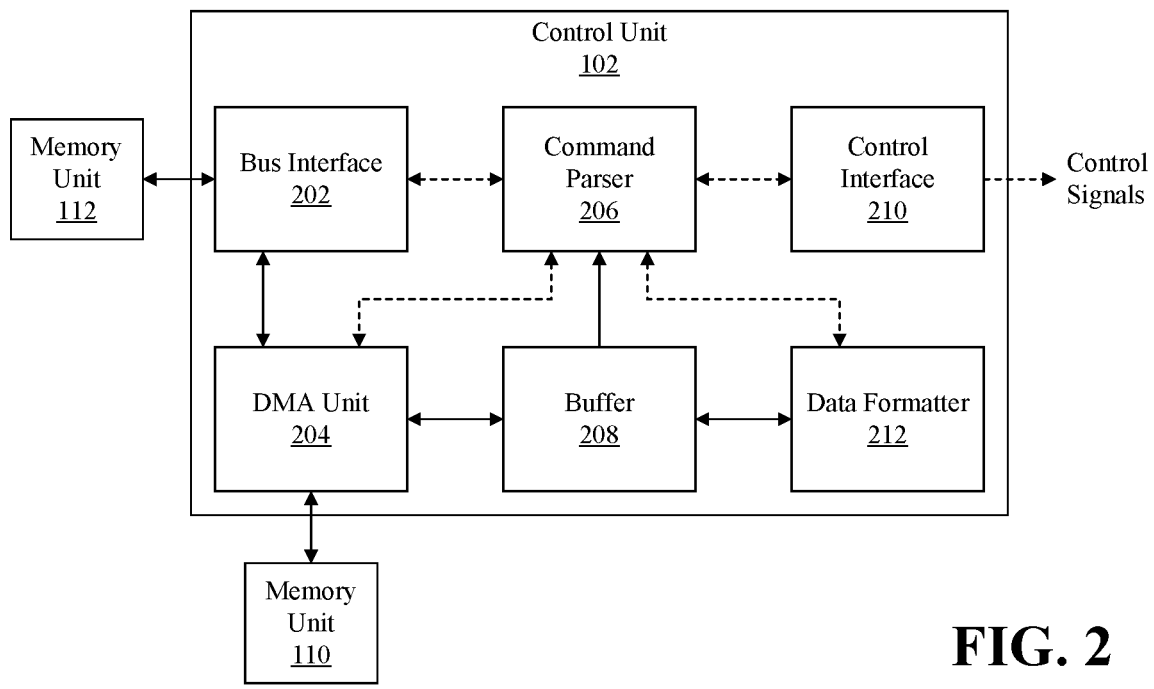
FIG. 2 is a block diagram illustrating an example of a control unit for a neural network processor.

FIG. 2 is a block diagram illustrating a control unit 200 for an NN processor. In one embodiment, control unit 200 is used to implement control unit 102 described with reference to NN processor 100 of FIG. 1. Control unit 200 includes a bus interface 202, a direct memory access (DMA) unit 204, a command parser 206, a buffer 208, a control interface 210, and a data formatter 212.

In general, command parser 206 controls operation of bus interface 202, DMA unit 204, control interface 210, and data formatter 212. Command parser 206 is capable of reading data from and/or writing data to memory unit 112 through bus interface 202. In one embodiment, bus interface 202 is implemented as an Advanced eXtensible Interface (AXI) compatible bus as defined by one or more of the ARM® AMBA® specifications put forth by Arm, Ltd. of Cambridge, UK. It should be appreciated, however, that the examples provided herein are not intended to be limiting. Bus interface 202 may be implemented using any of a variety of known bus technologies and/or bus interconnect technologies for integrated circuits. Accordingly, command parser 206 is capable of reading macro instructions from memory unit 112, reading input data and weights from memory unit 112, and writing data to memory unit 112 via bus interface 202.

Command parser 206 is capable of reading data from and/or writing data to memory units 110 through DMA unit 204. Buffer 208 is configured to store data temporarily. In one aspect, buffer 208 is implemented as an SRAM buffer. In one example embodiment, buffer 208 is implemented as a 32 KB SRAM buffer. Buffer 208 may be used to provide data to data formatter 212. Data formatter 212 is capable of translating data from one format to another format. For example, data formatter 212 is capable of translating values from log format to a non-log (e.g., linear) format.

Command parser 206 is also capable of parsing macro instructions and, as part of executing a macro instruction, providing the macro instruction to control interface 210. Control interface 210 is capable of translating the received macro instruction from command parser 206 into one or more control signals. Control interface 210 provides the control signals to the processing units of NN 100 described in connection with FIG. 1.

Figure 3:
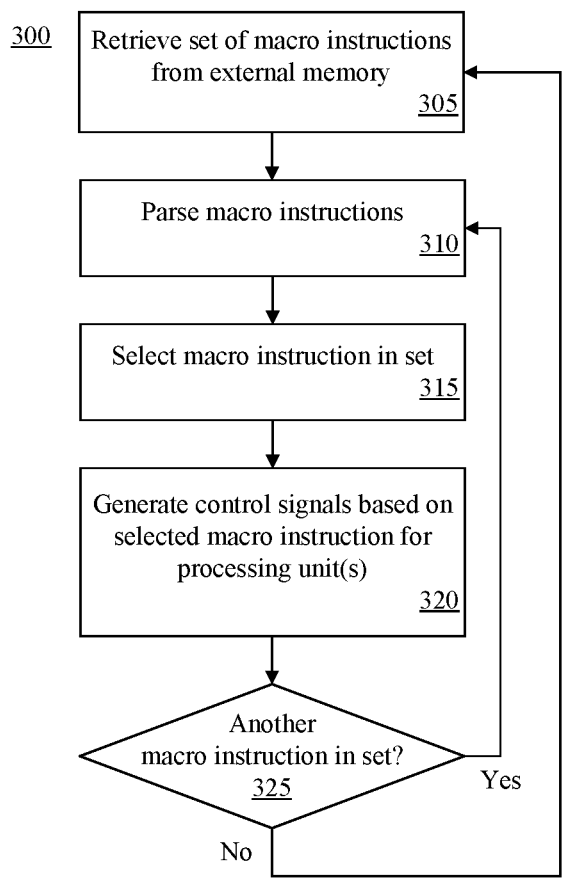
FIG. 3 is a flow chart illustrating an example method of operation for a neural network processor.

FIG. 3 is a flow chart illustrating an example method 300 of operation performed by NN processor 100 of FIG. 1. Method 300 may begin in a state where the NN processor is executing a neural network. Accordingly, in block 305, the NN processor retrieves one or more instructions, e.g., macro instructions, from external memory. In one example, control unit 102 is configured to retrieve one or more, e.g., a set, of macro instructions from external memory.

In block 310, the NN processor parses the received macro instructions. For example, command parser 206 of control unit 102 parses the macro instructions retrieved in block 305. In block 315, the NN processor selects a particular macro instruction for execution. For example, command parser 206, in selecting a macro instruction, is capable of providing the selected macro instruction to control interface 210.

In block 320, the NN processor generates control signals based on the selected macro instruction for one or more processing units included therein. For example, the control interface, responsive to receiving the macro instruction from command parser 206, generates control signals based on the macro instruction. The control signals are distributed or provided to one or more of the processing units used to execute the macro instruction and perform a macro operation responsive to the macro instruction.

In block 325, the NN processor determines whether any further macro instructions remain in the set retrieved in block 305. If so, method 300 may loop back to block 310 to continue processing. If not, method 300 may loop back to block 305 to retrieve additional macro instruction from external memory for processing.

As briefly discussed, a computer-based utility may process a description of a neural network to generate the macro instructions. These macro instructions may then be executed by a NN processor as described herein. The following describes various examples of macro instructions that may be generated by the computer-based utility and provided to the NN processor in a predetermined sequence to implement a neural network.

Macro instructions may include or indicate different information used to implement a macro operation. In one example embodiment, a macro instruction may indicate a first data set, a second data set, and a macro operation. The macro operation may be performed using the first data set and the second data set. In a further embodiment, the macro instruction is capable of indicating a mode of operation for performing the macro operation. In some cases, the mode of operation may be a default value for a default mode of operation. In other cases, the mode of operation may be a value indicating one of a plurality of different modes of operation. Examples of macro instructions are described in greater detail below.

Examples of different macro instructions that may be executed by the NN processor include, but are not limited to, convolution macro instructions, vector products macro instructions, pooling macro instructions, sub-sampling macro instructions, activation function macro instructions, LSTM macro instructions, and data movement macro instructions. In some cases, macro instructions may also specify variable precision for the operations to be performed. Each of the different types of macro instructions may be provided to one or more particular processing units within the NN processor by way of the control signals. For example, control unit 102 may process a received macro instruction, determine the particular processing units to which the received macro instruction pertains, and generate the necessary controls signals to such processing units to implement the macro operation specified by the macro instruction(s).

As an illustrative example, control unit 102 may execute a data movement macro instruction. Control unit 102 generates control signals that cause retrieval of input data (e.g., feature maps or values) and convolution kernels (weights) from external memory. Execution of the data movement macro instruction causes the input data (e.g., a first data set) and the weights (a second data set) to be retrieved from memory unit 112 and stored in one or more memory units 110. After execution of a data movement macro instruction, the block of data to be operated upon is stored in memory units 110 and is available for processing using other processing units within NN processor 100.

In another example, execution of a data movement macro instruction may cause data stored in memory unit 110 to be moved to memory unit 112. For example, results generated by DRU 108 may be stored in memory units 110. In executing a data movement macro instruction, control unit 102 may cause data stored in memory units 110 to be moved out to, and stored in, memory 112.

In another aspect, a data movement macro instruction may also indicate a type of format conversion that is to be applied to the data. The format conversion may be applied by data formatter 212 of control unit 102. In one aspect, data may be converted from linear to LNS format or vice versa. For example, control unit 102, in executing a data movement macro instruction specifying format conversion, may direct the values from memory unit 112 and/or memory units 110 through buffer 208, perform format conversion using data formatter 212, and send the format converted data to memory unit 112 and/or memory units 110 via buffer 208. In one embodiment, whether format conversion is performed and the type of format conversion (e.g., linear to log domain or log domain to linear) may be indicated as part of the mode of operation of the data movement macro instruction.

Control unit 102 may execute a convolution macro instruction. In general, the convolution macro instruction causes AAC arrays 106 to perform convolution and accumulate the results. In one example embodiment, control unit 102, in executing a convolution macro instruction, causes input data paths 104 to read a portion of the input data and the weights from memory units 110 and provide the input data and weights to AAC arrays 106. As discussed, weight decompressor 122 within input data path 104 is capable of decompressing weights so that AAC arrays 106 receive decompressed weights.

AAC arrays 106, responsive to control signals from control unit 102 in executing the same convolution macro instruction may convolve an x-y region (e.g., an N×N region where N is an integer greater than 1) of an input feature map (e.g., the input data) with a plurality of weights to generate an output feature map or a portion of an output feature map. For example, a macro convolution instruction may indicate particular input feature maps to process, particular x-y regions of the input feature maps to process, and the weights to be applied to the various regions.

AAC arrays 106 are capable of looping through a set of input feature maps and applying the corresponding set of filter kernels. For example, from one macro instruction, AAC arrays 106 are capable of processing an x-y region from each of 16 input feature maps by applying different 3×3 kernels to each region, accumulating the results, and generating an output feature map. As a non-limiting, illustrative example, the regions may be 4×4 regions. Further, results for a plurality of output feature maps may be generated in one macro instruction. The described operations may occur over many cycles as a consequence of executing a single macro convolution instruction.

In one example embodiment, functions such as skipping zero weights and/or zero values may be performed automatically within AAC array 106 using circuitry that skips application of weights that have a zero value and/or input data that has a zero value.

As noted, some macro instructions support variable precision. For purposes of illustration, AAUs 130 may be implemented to handle N bit values. In the case where one or more weights are more than N bits, e.g., 2N bits, the macro instruction may handle the change in precision required. In one example embodiment, the macro convolution instructions may indicate that a particular portion of a weight is to be applied.

Consider an example where the AAUs 130 are configured for 8-bit operation. The AAUs 130 may perform calculations of higher precision, e.g., 16-bit, by breaking up the calculation into two or more macro instructions where each macro instruction applies a different portion of the weight to the input data. In illustration, control unit 102 may execute a first macro instruction that causes AAC arrays 106 to process a set of input feature maps using the lower half of a weight (e.g., the bottom 8 bits of a 16-bit weight). Control unit 102 may then execute a second macro instruction that causes AAC array 106 to apply the top half of the weights (e.g., top 8 bits) to the same input feature maps. As such, weights may be applied using selected precision with the results from each macro instruction being accumulated within the AAUs 130. It should be appreciated that a convolution macro instruction causes AAC array 106 to perform add accumulate operations when configured to operate in log domain. When AAC array 106 is configured to operate in the linear domain, the convolution macro instruction causes the AAC array 106 to perform multiply accumulate operations.

In a further aspect, the convolution macro instructions may indicate whether a scatter mode of operation or a gather mode of operation is implemented using AAC array 106. In one example embodiment, the indication of scatter mode or gather mode is specified as part of the mode of operation of a convolution macro instruction. In the scatter mode of operation, two or more matrix multiplies are applied to each input feature map to generate the contribution of each input feature map to multiple output feature maps for the next layer of the neural network. Each processed input map is scattered to several output maps. As an example of scatter mode operation, a convolution macro instruction may cause AAC arrays 106 to process 16 input feature maps and generate the contribution to each of a plurality of output feature maps. For example, responsive to one convolution macro instruction, AAC arrays 106 may process a first input feature map by applying four kernels. Each kernel application results in generating a portion of output feature maps 1-4. A further convolution macro instruction may cause AAC array 106 to select the next input feature map and apply four kernels resulting in further portions of output feature maps 1-4, and so forth.

In the gather mode of operation, several input feature maps are convolved and those results are combined to generate output to a single output feature map. As an example of the gather mode of operation, AAC arrays 106 may apply 16 kernels to 16 input feature maps to generate one output feature map. AAC arrays 106 may perform the gather mode of operation to generate additional output feature maps. To process all feature maps from a layer N of a neural network to generate all feature maps in layer N+1 of the neural network, AAC arrays 106 may employ a combination of scatter and gather modes. The choice of which mode to use and when may be specified by the particular macro instructions that are executed to minimize overall computation and storage footprint of the intermediate data to be maintained in generating the next layer. In this way, AAC arrays 106 are capable of dynamically operating in scatter mode or gather mode.

Control unit 102 may also execute a vector products macro instruction. In general, the vector products macro instruction causes AAC arrays 106 to perform a set of vector products on a set of input data and accumulate the results. Control unit 102, in executing a vector products macro instruction, is capable of instructing input data paths 104 to read values (e.g., feature classification values) and weights (e.g., weights for a feature classification layer of a neural network) from memory unit 110 and provide the same to AAC arrays 106. AAC arrays 106 are capable of performing the vector product and accumulation processing. As an illustrative example, a single vector products macro instruction may cause AAC arrays 106 to apply 16 sets of 4,096 weights to 4,096 input values and accumulate the 16 results in parallel. Thus, the vector products macro instruction specifies multiple input values, the multiple weights to be applied, and further causes accumulation of the result.

In another example, the vector product macro instruction may also specify different precision as described in connection with the convolution macro instruction. For example, one vector product macro instruction may cause the application of the lower portion of the weights to the input values during a first pass while a further vector product macro instruction may cause the application of the upper portion of the weights to the input values during a second pass with the results being accumulated. The results may be accumulated in the same 16 accumulators (e.g., using AAUs 130). It should be appreciated that a vector product macro instruction causes AAC arrays 106 to perform add accumulate operations when configured to operate in log domain. When AAC arrays 106 are configured to operate in the linear domain, the vector product macro instruction causes the AAC array 106 to perform multiply accumulate operations.

Control unit 102 may execute a pooling macro instruction and/or a sub-sampling macro instruction. The macro instruction may indicate whether pooling or sub-sampling is to be performed. Further, the macro instruction may indicate whether the specified operations are to be performed horizontally, vertically, or both horizontally and vertically. In one example embodiment, responsive to the pooling macro instruction or sub-sampling macro instruction, accumulated results provided from AAC array 106 are provided to the DRU 108. Within DRU 108, sub-sampling unit 140 and/or pooling unit 142 is capable of operating on the accumulated data. Sub-sampling unit 140 and pooling unit 142 each is capable of vertical and/or horizontal operation depending upon the macro instruction received.

For example, sub-sampling unit 140 and pooling unit 142 may read a variable number of regions (e.g., 4×4 regions of output feature maps) and perform pooling or sub-sampling as the case may be to generate one output 4×4 region of an output feature map. The macro instruction indicates the number of input 4×4 regions that are to be processed to generate one output 4×4 region. The macro instruction may be implemented over multiple cycles with each cycle feeding additional input to the relevant unit to generate the final 4×4 output region.

As another example, sub-sampling unit 140, responsive to the macro instruction, is capable of sub-sampling four 4×4 regions by a factor of 4 to generate 1 horizontally scaled 4×4 region. The macro instruction may be followed by additional macro instructions to horizontally reduce 3 more row sets of the 4×4 region below the first to generate a 4×16 column of data. A further macro instruction may reduce the four 4×4s in a column vertically to generate a final 4×4 representing an input region sub-sampled by 4 in each direction. Operation of sub-sampling unit 140 and pooling unit 142 are described in greater detail herein in connection with FIG. 4.

Control unit 102 may execute an LSTM macro instruction. The LSTM macro instruction may cause a processing unit, e.g., processor unit 146 or another processor unit within DRU 108, to evaluate a gate for a set of LSTM cells. As an illustrative example, a vector products macro instruction may have been executed prior to the LSTM macro instruction. Control unit 102, in executing the LSTM macro instruction, causes the relevant processing unit to receive the results of the vector products macro instruction as input. The processing unit performs gate evaluation for a set of LSTM cells in parallel. For example, the processing unit may combine two sets of vector product results to evaluate the forget gates of 16 different LSTM cells. LSTM gate processing is described in greater detail herein in connection with FIGS. 5 and 6.

Control unit 102 may execute an activation function macro instruction. In executing the activation function macro instruction, control unit 102 may cause AFU 144 to apply a particular, e.g., selected, activation function to accumulated results. The activation function macro instruction may indicate a particular activation function from a plurality of different available activation functions and cause the selected activation function to be applied to a particular accumulated result. As such, different activation functions may be applied to different accumulated results based upon the activation function macro instruction that is executed.

Figures 1, 4:
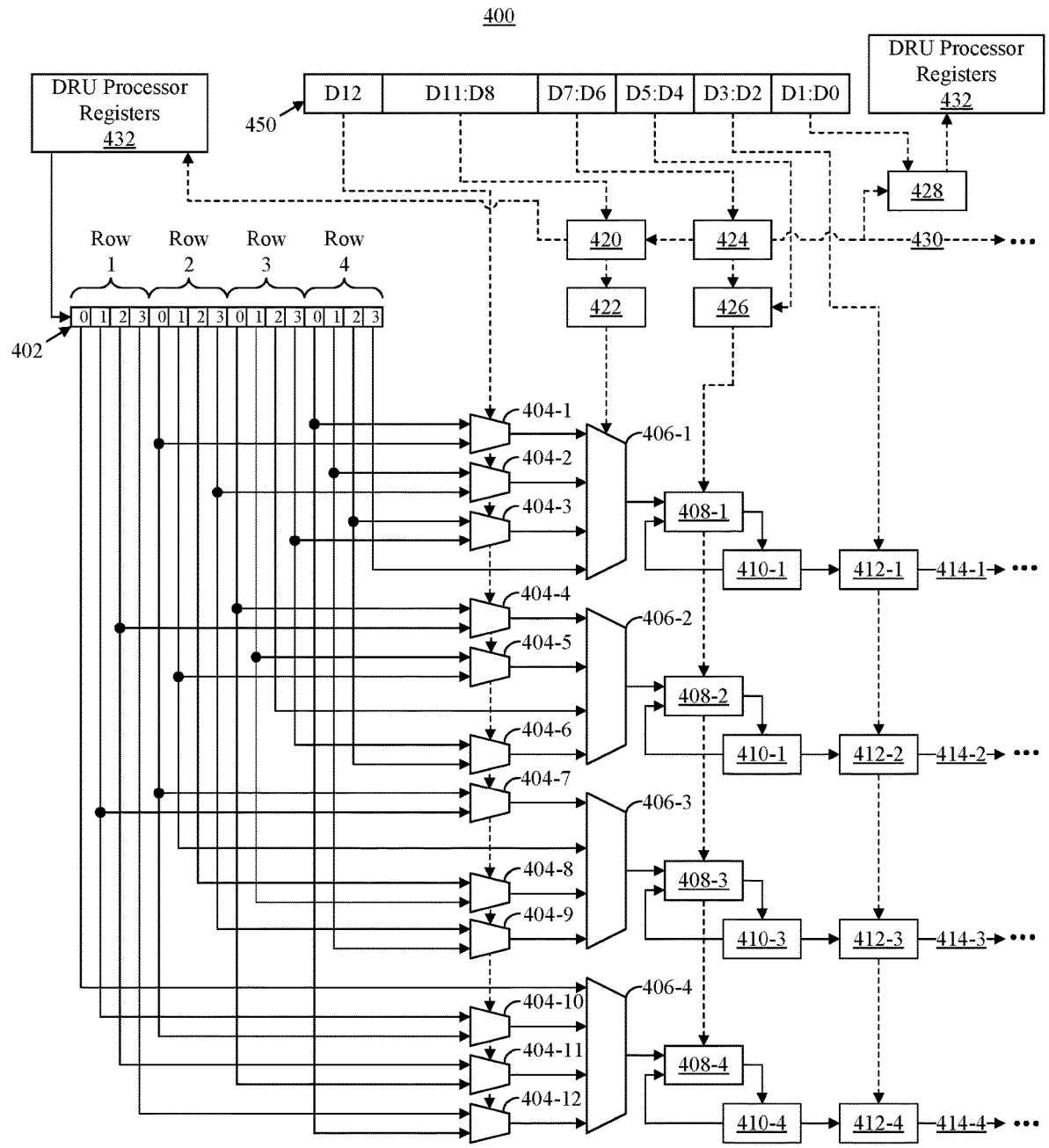
Figures 2, 4:
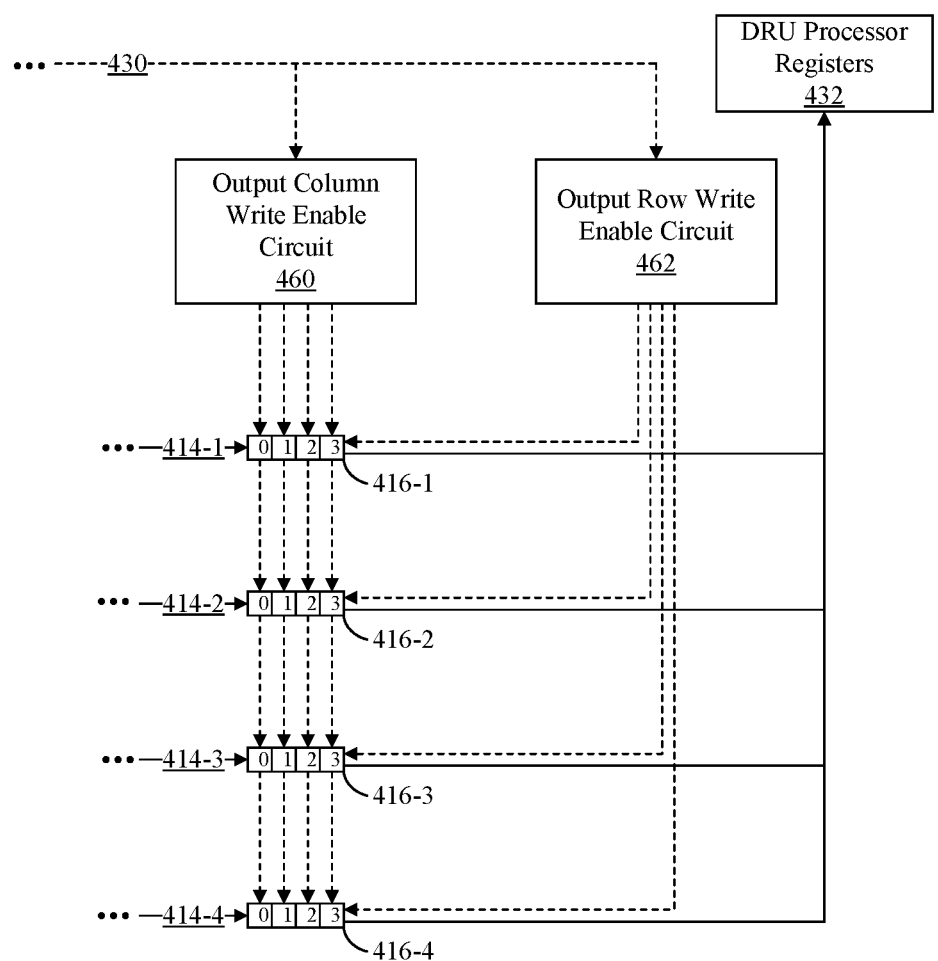

FIGS. 4-1 and 4-2, taken collectively, illustrate an example of a processing unit 400. In one aspect, processing unit 400 is used to implement sub-sampling unit 140 of FIG. 1. In another aspect, processing unit 400 is used to implement pooling unit 142 of FIG. 1. In the example of FIG. 4, processing unit 400 may operate on data stored in register 402 over a plurality (e.g., a variable number) of cycles to generate a 4×4 region of data as output. The data may be processed vertically or horizontally.

Operation of processing unit 400 is determined by the macro instruction, or portion thereof, stored in instruction register 450. The macro instruction stored in instruction register 450 is obtained from the control signals provided to processing unit 400 from control unit 102 responsive to executing a macro instruction, e.g., a pooling or sub-sampling macro instruction. In one aspect, different portions of the instruction stored in instruction register 450 control different elements of processing unit 400 as described in further detail below.

For example, a 4×4 region of input data (e.g., a 4×4 region of a feature map) is read from a DRU processor register 432 of DRU 108 and stored in register 402 for processing. During each cycle, one column (or row as the case may be) is selected from register 402 and output through multiplexers 404 and 406 and fed to operation units 408. Data fed to the operation units 408 is written to the accumulator units 410. Subsequent columns (or rows as the case may be) are combined with the value stored in the accumulator units 410.

In the case of sub-sampling, selected rows or columns are passed through the accumulator units 408 and to output registers 416 (in FIG. 4-2 via signals 414). As shown, bit D12 of the macro instruction from instruction register 450 controls vertical or horizontal operation and is provided to multiplexers 404 as a control signal. Operation units 426 are capable of performing a MAX operation, an ADD operation, or a MOVE operation. Bits D5:D4 of the macro instruction stored in instruction register 450 are provided to operation selector 426. Operation selector 426 instructs operation units 408 whether to perform a MAX value operation, an ADD operation, or a MOVE operation. In the case of pooling, for example, operation units 408 are capable of performing a MAX operation or an ADD operation where the result is written to the accumulator units 410.

Bits D11:D8 of the macro instruction stored in instruction register 450 are provided to an adder 420 as a control signal controlling the input stride. In one example embodiment, adder 420 is implemented as a 4-bit position adder. Adder 420 is capable of generating a control signal that is provided to an input row/column selector 422. Input row/column selector 422 generates the select signal provided to multiplexers 406.

Bits D7:D6 are provided to a sample counter 424 as a control signal. In one example embodiment sample counter 424 is a 2-bit sample counter. Sample counter 424 further provides a carry out bit as a control signal indicating when to clear adder 420. Sample counter 424 provides the sample count as an output to an output counter 428 via control signal 430. Bits D3:D2 of the macro instruction are provided to shift and round circuits 412 as a right shift control signal indicating the number of bit positions each of shift and round circuits 412 is to shift the data received therein. Bits D1:D0 are provided to output counter 428 to indicate the number of columns and/or rows to be processed. Output counter 428 is capable of generating an output control signal to DRU processor registers 432 to indicate when a 4×4 region is ready based upon the received sample count compared to the value from bits D1:D0 of the macro instruction.

Rows and columns are written sequentially to output registers 416 (by way of data signal 414). When either 4 rows or 4 columns (or fewer according to an output count maintained by output counter 428) are processed, data from output registers 416 is written to DRU processor registers 432. As noted, the data may be rows of data, e.g., where each of output registers 416 stores a row. The data may be columns of data, where each of output registers 416 outputs a bit from the register. For vertical operations, output column write enable circuit 460 write enables a selected column of individual registers (bit positions) of output registers 416. For horizontal operations, output row write enable circuit 462 write enables the selected row of output registers 416. As shown, each of output column write enable circuit 460 and output row write enable circuit 462 receive control signal 430 from sample counter 424 to indicate when to output data.

As can be seen, setting the appropriate values within instruction register 450 initiates a plurality of different operations throughout processing unit 400. In one embodiment, the macro instruction stored in instruction register 450 may be specified by control unit 102. Control unit 102 executes a single macro instruction that generates control signals to processing unit 400 thereby storing the instruction within instruction register 450.

The architecture described with reference to FIG. 4 is provided for purposes of illustration only. Processing unit 400, for example, may include fewer or more elements than shown. Further, the macro instruction implementation described with reference to FIG. 4 is provided for purposes of illustration only and, as such, is not intended as a limitation.

Figure 5:
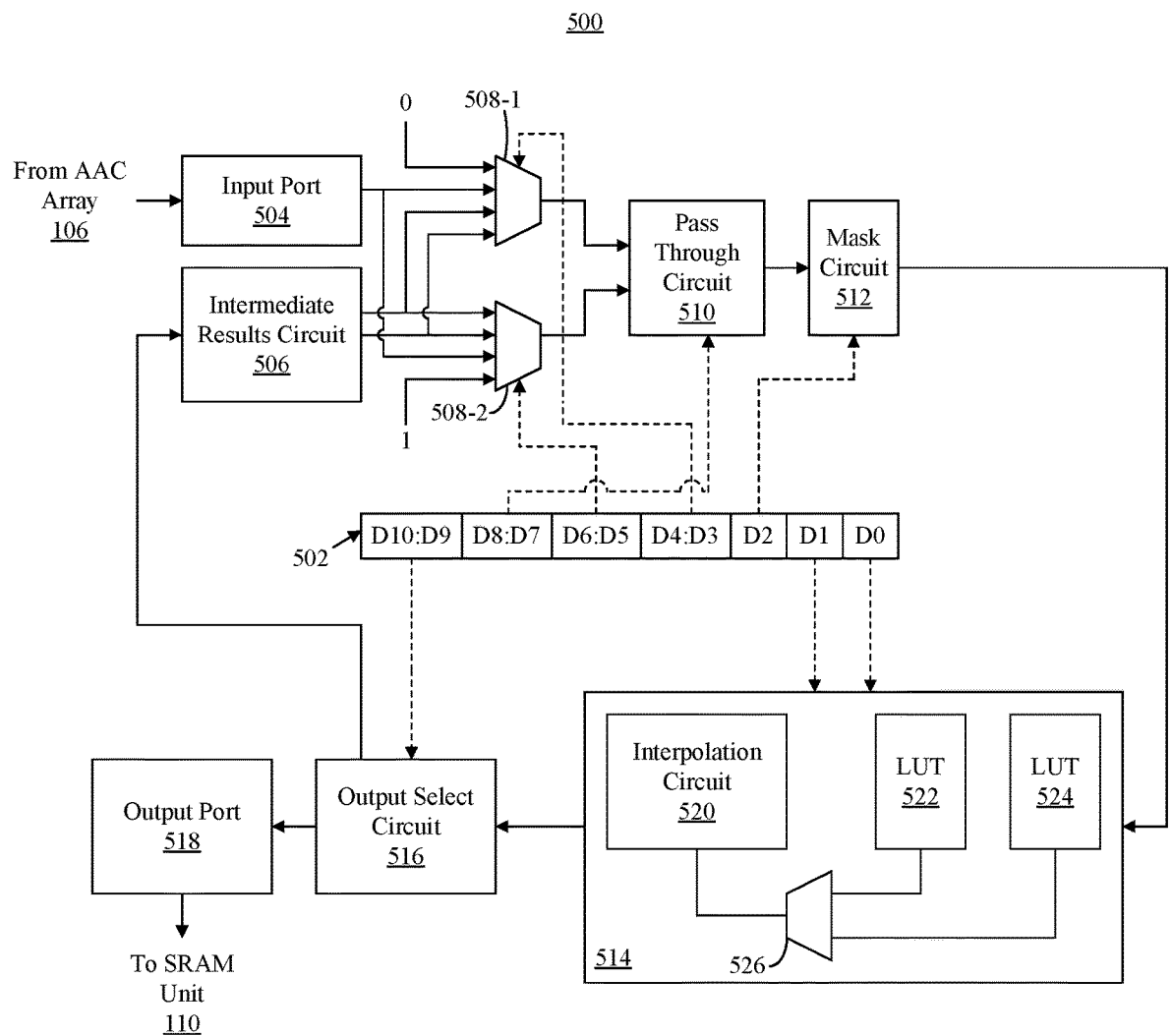
FIG. 5 illustrates another example of a processing unit for a neural network processor.

FIG. 5 illustrates another example of a processing unit 500. Processing unit 500 is capable of performing operations supporting LSTM cell evaluation. Processing unit 500, for example, is configured to evaluate one or more gates of an LSTM cell. In one example embodiment, processing unit 500 may be used to implement processor unit 146 of DRU 108 in FIG. 1. In another example embodiment, processing unit 500 may be included within DRU 108 as an additional processing unit not illustrated in FIG. 1.

Processing unit 500 includes an instruction register 502 that may be loaded with a macro instruction or portion thereof, e.g., control bits, as determined from control signals generated by and provided from control unit 102. As pictured, instruction register 502 includes a plurality of different fields that control operation of multiplexers 508, pass through circuit 510, mask circuit 512, AFU 514, and output select circuit 516. An input port 504 receives data from AAC array(s) 106. Input port 504 passes the received data to both multiplexers 508-1 and 508-2. Similarly, intermediate results registers 506 may include registers and is capable of passing received data to multiplexers 508-1 and 508-2. In one aspect, intermediate results circuit 506 includes two registers.

Multiplexer 508-1 is controlled by bits D4 and D3 of the macro instruction stored in instruction register 502. More particularly, bits D4 and D3 are used as the select signal for multiplexer 508-1. When bits D4:D3 are 00, multiplexer 508-1 passes the null value. When bits D4:D3 are 01, multiplexer 508-1 passes the value from the input port. When bits D4:D3 are 10, multiplexer 508-1 passes the value from the first register of intermediate results circuit 506. When bits D4:D3 are 11, multiplexer 508-1 passes the value from the second register of intermediate results circuit 506.

Multiplexer 508-2 is controlled by bits D6 and D5 of the macro instruction stored in instruction register 502. More particularly, bits D6 and D5 are used as the select signal for multiplexer 508-2. When bits D6:D5 are 00, multiplexer 508-2 passes the null value. When bits D6:D5 are 01, multiplexer 508-2 passes the value from the input port. When bits D6:D5 are 10, multiplexer 508-2 passes the value from the first register of intermediate results circuit 506. When bits D6:D5 are 11, multiplexer 508-2 passes the value from the second register of intermediate results circuit 506.

Pass through circuit 510 is controlled by bits D8 and D7. When bits D8:D7 are 00, pass through circuit 510 performs an add operation on the values received from multiplexers 508. When bits D8:D7 are 01, pass through circuit 510 performs a multiplication operation on the values received from multiplexers 508. When bits D8:D7 are 10, pass through circuit 510 passes the value from multiplexer 508-1. When bits D8:D7 are 11, pass through circuit 510 passes the value from multiplexer 508-2.

Mask circuit 512 is capable of either clearing the sign bit of a value received from pass through circuit 510 or allowing the sign bit to go unchanged. Mask circuit 512 is controlled by bit D2 of the instruction stored in instruction register 502. For example, when D1 is 0, mask circuit 512 clears the sign bit of the value received from pass through circuit 510. When D1 is 1, mask circuit 512 leaves the sign bit of the value received from pass through circuit 510 unchanged.

AFU 514 receives the output from mask circuit 512. As pictured, AFU 514 includes an interpolation circuit 520, a lookup table (LUT) 522, a LUT 524, and a multiplexer 526. AFU 514 may be controlled by bits D0 and D1 of the macro instruction stored in instruction register 502. For example, when bit D0 is set to 0, LUTs 522 and 524 are bypassed. When bit D0 is set to 1, the signal received from mask circuit 512 is run through, e.g., processed by, LUT 522 and/or LUT 524. When bit D1 is set to 0, LUT 524 is selected for use to process the signal received from mask circuit 512. When bit D1 is set to 1, LUT 522 is selected for use to process the signal received from mask circuit 512.

In one example embodiment, the architecture illustrated for AFU 514 may be used to implement AFU 144 of FIG. 1. AFU 144 of FIG. 1, for example, may be implemented using LUTs in combination with an interpolation circuit, and multiplexer as shown. In another example, AFU 144 may be incorporated into, or coupled to, processor unit 146 as depicted in FIG. 5 with AFU 514. The examples illustrated in FIGS. 1 and 5 are provided for purposes of illustration only and are not intended as limitations.

Output select circuit 516 is configured to send results received from AFU 514 to output port 518 or to intermediate results circuit 506. Output select circuit 516 may be controlled by bits D10 and D9 of the instruction stored in instruction register 502. For example, when bits D10:D9 are set to 00, output select circuit 516 provides the value received from AFU 514 to output port 518. The value of 01 for bits D10 and D9 may be reserved. When bits D10:D9 are set to 10, output select circuit 516 provides the value received from AFU 514 to the first register within intermediate results circuit 506. When bits D10:D9 are set to 10, output select circuit 516 provides the value received from AFU 514 to the second register within intermediate results circuit 506.

As can be seen, setting the appropriate values within instruction register 502 initiates a plurality of different operations throughout processing unit 500. In one embodiment, the macro instruction stored in instruction register 502 may be specified by control unit 102. Control unit 102 executes a single macro instruction that generates control signals to processing unit 500 thereby storing the instruction within instruction register 502.

The architecture described with reference to FIG. 5 is provided for purposes of illustration only. Processing unit 500, for example, may include fewer or more elements than shown. Further, the macro instruction implementation described with reference to FIG. 5 is provided for purposes of illustration only and, as such, is not intended as a limitation.

Figure 6:
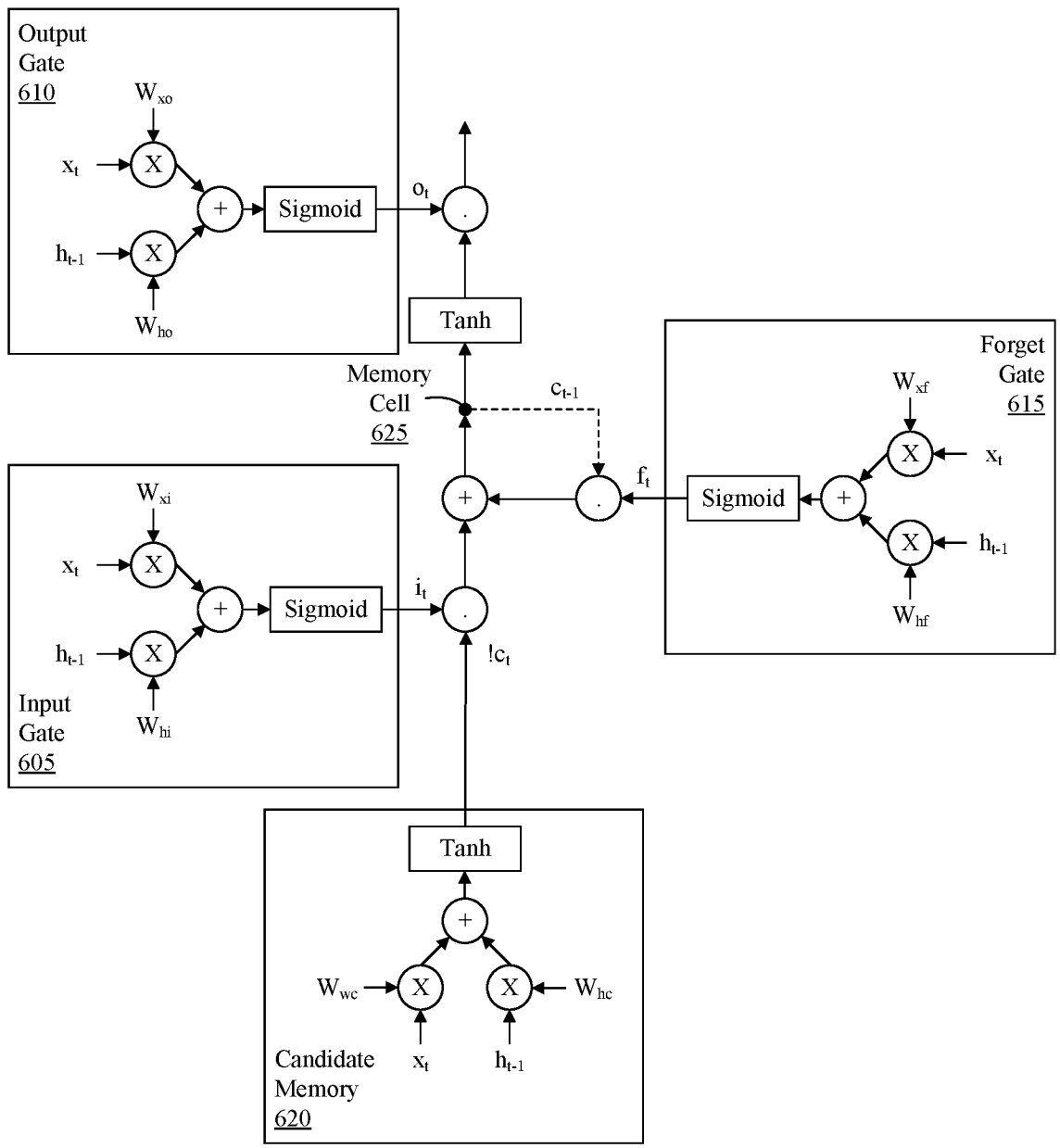
FIG. 6 is a functional diagram illustrating example processing for a Long Short Term Memory (LSTM) cell.

FIG. 6 is a functional diagram illustrating example processing for an LSTM cell 600. Processing unit 500 described in connection with FIG. 5 is capable of performing the operations illustrated in FIG. 6. As pictured, LSTM cell 600 includes an input gate 605, an output gate 610, a forget gate 615, candidate memory 620, and a memory cell 625. Within FIG. 6, the symbol "." is used to represent element wise multiplication. The symbol "x" is used to represent vector product operations. The symbol "+" is used to represent element wise add operations. Activation operations are represented using blocks labeled "Sigmoid" and "Tanh." It should be appreciated that other activation functions may be used and that those illustrated in FIG. 6 are for purposes of illustration only.

For purposes of illustration, input gate 605 receives input data $x_t$ and $h_{t-1}$ and weights $W_{x1}$ and $W_{hi}$. Input gate 605 calculates vector products of the input data and weights using each of the vector product operators. In one illustrative example, processing unit 500 receives a plurality of macro instructions from control unit 102. A first macro instruction causes processor 500 to calculate a vector product using input data $x_t$ and weights $W_{xi}$ corresponding to input gate 605. For example, the input data and weights may be received via input port 504 and provided to pass through circuit 510 to generate the vector products. The vector products may be stored in intermediate results circuit 506. In one example, the first macro instruction from control unit 102 causes processing unit 500 to generate one vector product for each of 16 LSTM cells resulting in 16 vector products.

Responsive to a second macro instruction from control unit 102, processing unit 500 is capable of generating a vector product using input data $h_{t-1}$ and weights $W_{hi}$ for input gate 605. Input data and weights received through input port 504 may be processed by pass through circuit 510 to generate the vector products, which may be stored in intermediate results circuit 506. Again, processing unit 500, responsive to the second instruction, is capable of generating one vector product for each of 16 LSTM cells.

A third macro instruction from control unit 102 causes processing unit 500 to sum the vector products generated using the first two macro instructions to continue processing for input gate 605. Processing unit 500 may read the vector products from intermediate results circuit 506 and sum the vector products using pass through circuit 510. The summed vector products again may be stored in intermediate results circuit 506. A fourth macro instruction from control unit 102 causes processor 500 to apply the activation function (e.g., the Sigmoid operation of input gate 605) to the summed vector products. For example, the summed vector products may be read from intermediate results circuit 506, passed through and processed using AFU 514, which may apply the applicable activation function. It should be appreciated that the particular activation function to be applied is specified by the macro instruction that is received. For example, depending upon the particular LUT that is enabled in AFU 514, the activation function that is applied will differ.

Processing unit 500 may perform operations as described with reference to input gate 605 for each of the other gates 610, 615, and for candidate memory 620. Execution of each macro instruction causes a plurality of operations to be performed over a plurality, e.g., many, cycles. As may be seen from FIGS. 5 and 6, the macro instructions may control the operations performed and the routing of data through processing unit 500 to perform the operations described.

Figure 7:
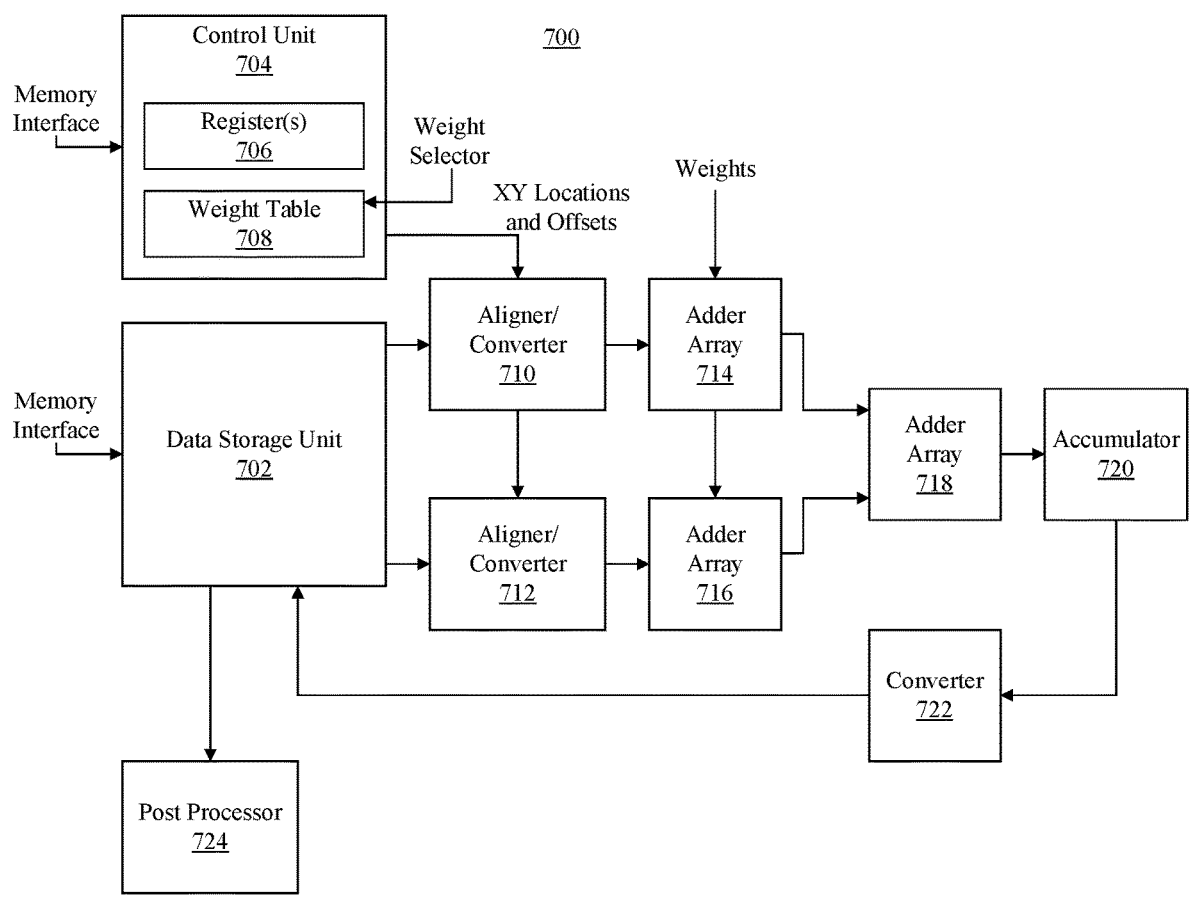
FIG. 7 is a block diagram illustrating an example matrix multiply unit for a neural network processor.

FIG. 7 is a block diagram illustrating an example matrix multiply unit (MMU) 700. MMU 700 is capable of operating on a rectangular portion of one or more input feature maps to generate the corresponding region of one or more output feature maps. MMU 700 may be incorporated into a NN processor. In one example embodiment, MMU 700, or portions thereof, may be used as a component within AAC array(s) 106. In another embodiment, depending upon the functionality included in post processor 724, MMU 700 may be used to implement a NN processor. As discussed, a NN processor may be implemented as an integrated circuit. As such, the various blocks illustrated in FIG. 7 represent circuitry of such a processor or unit.

In one aspect, MMU 700 is capable of operating in scatter mode where two or more matrix multiplies are applied to each input feature map to generate the contribution of each input feature map to multiple output feature maps for the next layer of the neural network. Each processed input map is scattered to several output maps. In another aspect, MMU 700 is capable of operating in gather mode where several input feature maps are convolved and those results are combined to generate output to a single output feature map.

To process all feature maps from a layer N of a neural network to generate all feature maps in layer N+1 of the neural network, MMU 700 may employ a combination of scatter and gather matrix multiply operations. The choice of which mode to use and when is specified by a network optimization utility to minimize overall computation and storage footprint of the intermediate data to be maintained in generating the next layer.

MMU 700 includes a control unit 704. Control unit 704 may include one or more registers 706 that store data representative of the current (x, y) locations of one or more input feature maps being processed (e.g., a first data set) and a weight table 708 defining one or more matrices (weights) to be applied (e.g., a second data set). MMU 700 may also include a register among registers 706 specifying which input data to apply the matrix to and which accumulators within accumulator 720 to direct the outputs to generate one or more output feature maps from one or more input feature maps from the specified set of one or more matrices. Control unit 704 is capable of storing and/or executing a sequence of instructions referred to as an "execution sequence." The data representative of the matrices and execution sequence will be described in greater detail later in connection with FIG. 10.

MMU 700 also includes a data storage unit 702, aligners/converters 710, 712, adder arrays 714, 716, and 718, an accumulator 720, a converter 722, and a post processor 724. Control unit 704 and data storage 702 are connected to a memory interface (I/F) for receiving input. Control unit 704 receives a weight selector signal as input and, in response thereto, outputs an address to data storage unit 702 for addressing the input feature maps. Control unit 704 also provides, as an output to aligner/converters 710, 712, the current (x, y) location, the (x, y) offsets associated with weights of the current matrix, and select fields indicating input and output map addresses.

Based on the address data from control unit 704, data storage unit 702 provides input feature map data to aligner/converters 710, 712. The provided portions of the input feature map are vertically aligned based on the current (x, y) location and the y-offset associated with weights of the current matrix. Aligner/converters 710, 712 horizontally align the received portions of the input feature map and, in some embodiments, perform numerical format conversion. For example, aligner/converters 710, 712 may convert numbers from a linear format to a log or LNS format. In another example embodiment, MMU 700 may receive feature maps and/or weights in LNS format so that aligner converters 710, 712 need not perform any conversion operations.

The horizontally and vertically aligned portions of the feature maps are provided to a first set of adder arrays 714, 716. The output is provided to the adder array 718, which stores the results generated in accumulator 720. Accumulator 720 provides its output to converter 722. In one example embodiment, converter 722 converts fixed point format values to floating point format values. Converter 722 is capable of storing output generated within data storage unit 702.

In one or more example embodiments, MMU 700 includes a post processor 724. Post processor 724 is capable of processing matrix multiply results. For example, post processor 724 is capable of performing one or more activation functions. Post processor 724 may include one or more pooling units, sub-sampling units, and/or renormalization units.

In a scatter mode of operation, MMU 700 is capable of operating on a rectangular region of one input feature map to generate the corresponding part of the output feature maps. In that case, inputs to MMU 700 stored in data storage unit 702 are matrix weights and a rectangular part of the input feature map. In one example, weights are formatted so that, for each weight, there is a corresponding shift position with horizontal and vertical components. Further, as noted, weights may be specified in LNS. Further, those weights corresponding to 0 are not included since they do not need to be processed. The input feature map also may be stored in LNS format.

MMU 700 is capable of applying N weights (for example, 4 or 8) each cycle to a rectangular path of the input feature map called a region. In one example, a region is 16×16. MMU 700 is capable of applying 4 weights to the region in one cycle to generate 1024 weighted samples. Weights are applied to the 16×16 input region and each of the results multiplexed into an input of the appropriate log-adder which sums pairs of contributions (from a pair or weights applied in that cycle, usually adjacent in the matrix).

Since MMU 700 operates in a log space, weights are applied to input data by doing an addition operation. MMU 700 uses log-adds (log(A+B) as a function of log(A) and log(B)) to replace standard add operations. These log-adds are done using a piecewise linear approximation of the function $\log(1+2^x)$.

In one embodiment, larger weights that require higher precision add operations are decomposed by the offline network optimization utility into multiple weights each corresponding to a portion of the weight that can be processed in one cycle. MMU 700 is capable of summing these separate contributions in the accumulation stage implemented with the log-adder.

In another embodiment, additional logic tracks and/or detects input feature map data corresponding to the log(0) and causes these areas to by bypassed or skipped in the matrix multiply operations since the areas make no contribution to the final result. In tracking regions of zero feature map values and/or weights, processing cycles are eliminated increasing average throughput.

After a set of weights is applied in a cycle and each pair of results summed together, those results are summed pairwise repeatedly until a single accumulated result is generated and added to the appropriate target output map's intermediate result (maintained in some form of internal storage). Once all matrix multiplies are performed for a given input feature map, the storage needed for that input feature map is released and recycled to generate new intermediate results (new output feature maps).

After the convolved input feature maps are added to the appropriate accumulators of accumulator 720 for the corresponding output feature maps, these accumulated results are further processed depending on the neural network definition. Typically, post processor 724 applies an activation function. The activation function may be applied by post processor 724 as a piecewise linear approximation. Post processor 724 further may perform maximum or average pooling, sub-sampling, and/or local renormalization operations to generate the final values of the next layer's feature map. These operations may also be performed in LNS resulting in greatly optimized arithmetic and corresponding reduction of silicon area and improved power efficiency.

Figure 8:
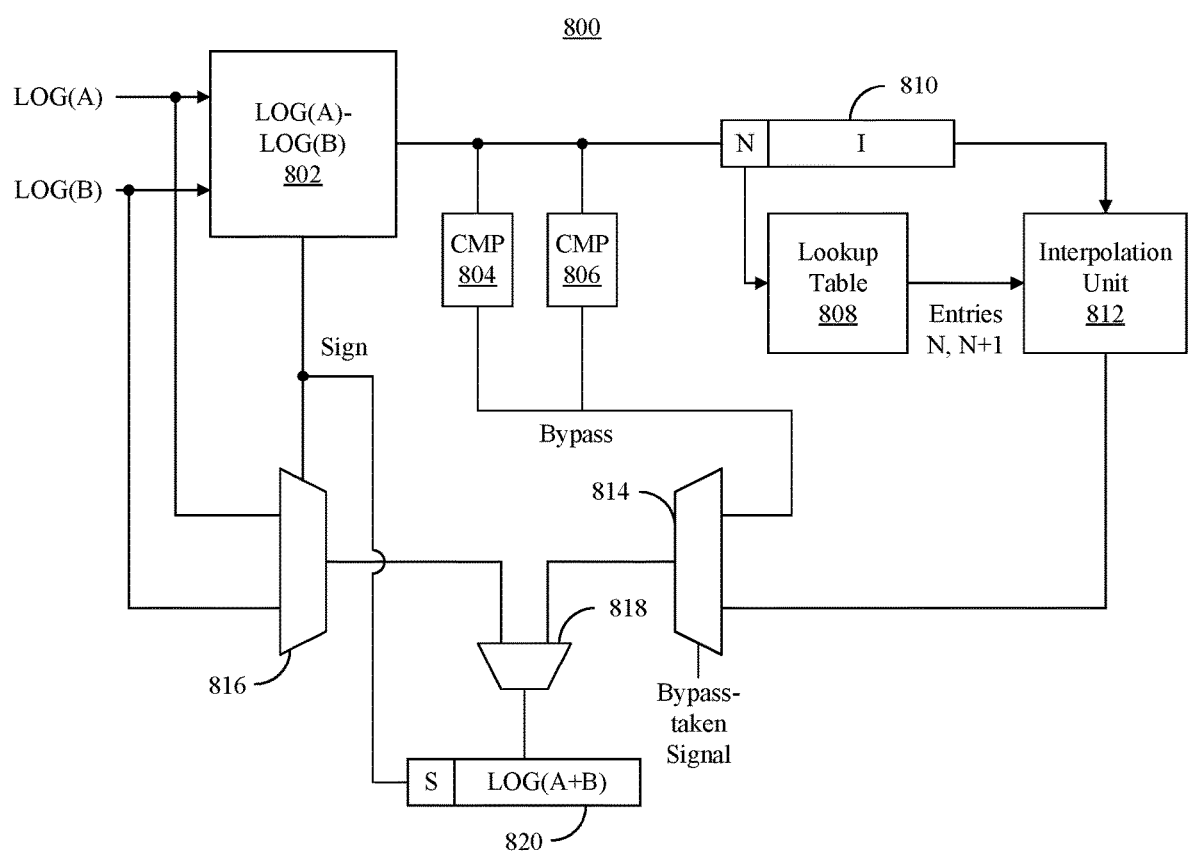
FIG. 8 is a block diagram illustrating an example of a log adder for use with a matrix multiply unit.

FIG. 8 is a block diagram illustrating an example embodiment of a log adder 800. Log adder 800 can correspond to one of a number of components of the adder arrays 714, 716, or 718 of FIG. 7. In another aspect, log adder 800 can be used to implement one of a number of components in AAUs 130 in the case where AAUs 130 operate in log domain. Log adder 800 is capable of computing an output that approximates the logarithm of a sum, e.g., log(A+B) given the inputs log(A) and log(B). Log adder 800 includes circuit blocks 802, 804, 806, a lookup table 808, a register 810, an interpolation unit 812, multiplexers 814, 816, an adder 818, and a register 820.

Circuit block 802 is capable of computing the log(A)–log(B) and for providing the magnitude and the sign of the result as separate outputs. Circuit blocks 204, 206 receive the magnitude output and compare the magnitude to high and low values, respectively, that are used to bypass logic that does a table lookup and interpolation operation. The bypass values are either 0 or the original magnitude value. When the bypass path is not taken, the magnitude output is passed to lookup table 808 and interpolation unit 812 to perform an interpolation to approximate $\log(1+2^x)$ using a piecewise linear function, where x represents abs(log(A)–log(B)). The sign output is passed to multiplexer 816 and is also used to determine the sign of output 820 of log adder 800.

Adder 818 receives the outputs of multiplexers 814, 816 as input and computes the sum as an output. The sum is stored in register 820. Multiplexer 814 selectively provides either the output of circuit blocks 804, 806 or the output of interpolation unit 812 based on a bypass taken signal generated by circuit blocks 804 and 806. In other words, multiplexer 814 passes the first input in response to the bypass-taken signal and otherwise provides or passes the second input. Multiplexer 816 selectively provides either log(A) or log(B) as an output based on the sign log(A)−log (B). That is, multiplexer 816 provides log(A) in response to the sign output indicating a positive value and provides log(B) in response to the sign output indicating a negative value.

Figure 9:
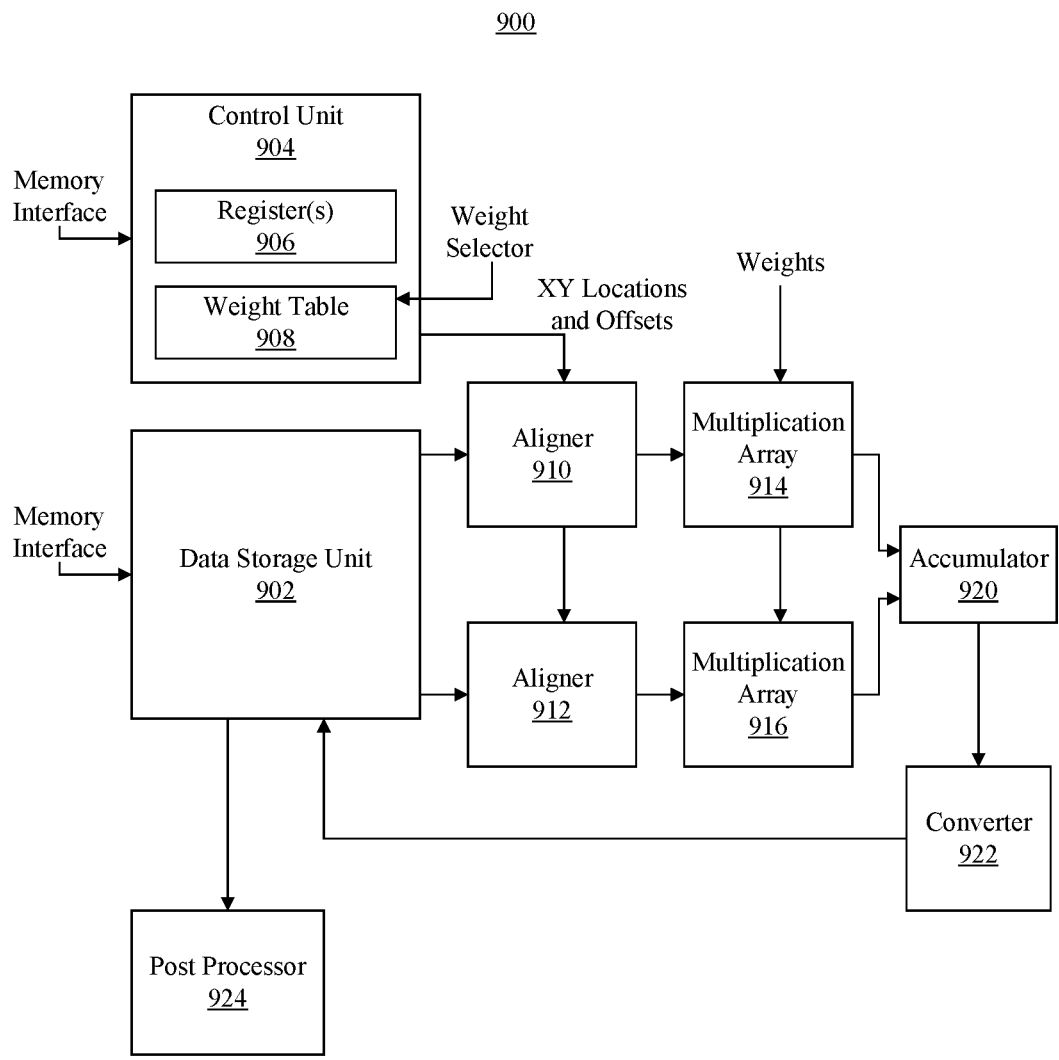
FIG. 9 is a block diagram illustrating another example of a matrix multiply unit for a neural network processor.

FIG. 9 is a block diagram illustrating another example matrix multiply unit (MMU) 900. MMU 900 is substantially similar to MMU 700 described with reference to FIG. 7. As shown, MMU 900 includes a control unit 904 having registers 906 and weight table 908, a data storage unit 902, aligners 910, 912, multiplication arrays 915, 916, accumulator 920, converter 922, and post processor 924. MMU 900, unlike MMU 700, operates using linear numbers. Accordingly, the aligner/converters are replaced with aligners 910 and 912. Further, the adder arrays are replaced with multiplication arrays 914 and 916, which store results in accumulator 920.

FIG. 10 is a schematic diagram of an execution table created based on the matrices M0 and M1. Execution table 1002 represents an execution sequence of instructions that may be executed by an MMU as described herein. The matrices M0 and M1 have some components that have the same or similar values (e.g., the A components) and also zero elements. Execution table 1002 takes into account these characteristics to generate operations to compute output feature maps in an efficient manner.

The first column of execution table 1002 represents the execution step number. The second column of execution table 1002 represents the values of the weights of the appropriate matrix. The third column of execution table 1002 represents the x offsets to add to the current x location of the feature map. The fourth column of execution table 1002 represents the y offset to add to the current y location of the feature map to weight the feature map with the value. In this way, the x offset and the y offset values update the base addresses to shift a window over the input feature maps. This window can be shifted before or after the weights are applied.

The fifth column of execution table 1002 indicates whether the weight is to be applied. For example, the weight can be selected but not applied when the input feature map data has already been multiplied by the weight in a previous step. This can be accomplished through proper alignment after applying the weights. The sixth column of execution table 1002 represents a selection of a feature map from a number of input feature maps. The seventh column of execution table 1002 represents a selection of a feature map (e.g., corresponding to a particular accumulator) from a number of output feature maps to apply the result.

For example, in the case that the input feature maps selections are the same, an MMU as described in connection with FIG. 7 or 9 operates in the scatter mode. In the case that the input feature maps selections are different and the output feature map selections are the same, the MMU operates in the gather mode. In this way, the MMU is capable of dynamically operating in scatter, gather, and 1:1 modes. Selection of the mode can be based on reducing computations and/or intermediate storage loads. Further, in the example of FIG. 10, execution table 1002 shows the sequence for both matrices M0 and M1 merged thereby illustrating how weight A can be applied once even though weight A is used two times in M0 and once in M1.

Figure 11:
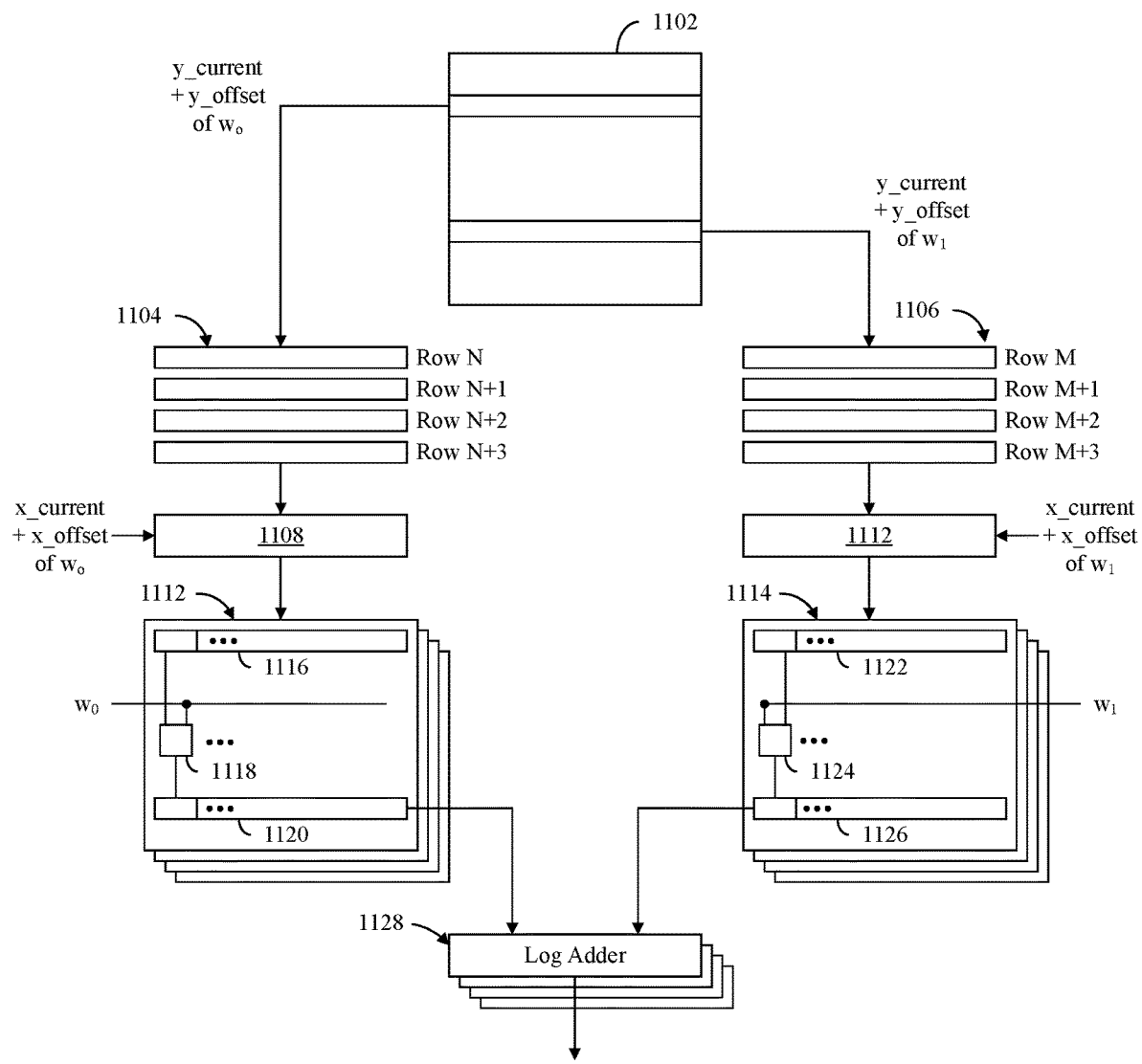
FIG. 11 is a block diagram illustrating operation of a matrix multiply unit in accordance with an example embodiment.

FIG. 11 is a block diagram representing operation of an MMU in accordance with an example embodiment. In one example, FIG. 11 illustrates operation of an MMU as described with reference to FIG. 7 and/or FIG. 9 of this disclosure.

Memory 1102 stores input feature map data. In an example embodiment, memory 1102 can correspond to SRAM (e.g., memory unit 110 or data storage unit 702 or 904), and can include 2 banks of 128×32 elements. The MMU accesses a first set of data based on the address y_current+y_offset determined for a first weight $w_0$. The first set of data is stored in buffers 1104 to vertically align the first set of data for processing. The MMU accesses a second set of data based on the address y_current+y_offset determined for a second weight $w_1$. The second set of data is stored in buffers 1106 to vertically align the second set of data for processing.

Buffers 1104, 1106 pass their data to respective circuit blocks 1108, 1110 to horizontally align the data (using the x_offsets for the corresponding weights $w_0$, $w_1$) and, in some embodiments, performs floating point format to fixed point conversion. The vertically and horizontally aligned data of circuit blocks 1108, 1110 are passed to the circuit blocks 1112, 1114 for adding the feature map data to the corresponding weights $w_0$ and $w_1$. For example, the feature map data are stored in buffers 1116, 1122. The buffered data is passed to adders 1118, 1124 as input. Adders 1118, 1124 receive as a second input the corresponding weights $w_0$, $w_1$. Because, in some embodiments, the data are in LNS, the addition of the data corresponds to multiplication in a linear number system.

Appreciably, in an embodiment where linear numbers are used, the adders 1118, 1124 may be replaced with multipliers. The outputs of the adders 1118, 1124 are stored in the buffers 1120, 1126, which are provided as inputs to the log adder 1128. In one example embodiment, log adder 1128 can correspond to the log adder 800 of FIG. 8. As shown in FIG. 11, blocks 1112, 1114 form an array of adders that can perform the additions in parallel. In an embodiment where linear numbers are used, the outputs of the multipliers may be provided to an accumulator with log adder 1128 being omitted.

In example embodiments, selected weights can be applied with more precision than others. Selected weights maybe applied with greater precision than other weights even within the same (e.g., a single) matrix. In one example, the MMU is capable of supporting higher precision operations by the software compiler generating the weight/sequencer stream (e.g., FIG. 10). The software compiler may break down high precision weights into 2 or more lower precision weights. For example, the weights may be short floating point, so the exponent field for the high half of a double precision weight can be incremented by the number of bits of precision used for the basic operation. If the MMU does 5-bit adds, for example, the top half of the exponent of the high-half weight can be incremented by 5 and the high 5 bits of mantissa can be the mantissa field. As such, this becomes another weight applied in some order that does not need to be performed or applied together with the low half of the weight since both halves eventually go to the same accumulator. By allowing separation in when the two halves of the weight are applied, the MMU can also cluster like low halves and like high halves to avoid redundant multiplies by either half of the weight. In example embodiments, the precision can be extended as far as the exponent field allows.

If, for example, the MMU repeatedly adds 5-bit chunks, eventually the MMU cannot add more 5s to the exponent field without overflowing.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship. As defined herein, the term "user" means a human being.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like. As defined herein, the term "plurality" means two or more than two. As defined herein, the term "real time" means a level of processing responsiveness that a user or system senses as sufficiently immediate for a particular process or determination to be made, or that enables the processor to keep up with some external process.

In some arrangements, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
receiving a macro instruction for implementing a neural network within a control unit of a neural network processor,
wherein the macro instruction indicates a first data set, a second data set, a macro operation for the neural network, and a mode of operation for performing the macro operation, the second data set comprising a plurality of first elements, and each first element comprising a value; and
automatically initiating the macro operation using a processing unit of the neural network processor by applying the second data set to the first data set based on the mode of operation and on an order of execution sequence of applying first elements of the second data set to the first data set so that a value of a first element that is a same value as another first element is applied a single time to the first data set for the macro operation, and
further comprising receiving a second macro instruction that indicates a second macro operation of applying an activation function to accumulated data and a second mode of operation indicating that the activation function is selected from a plurality of activation functions.

2. The method of claim 1, wherein the macro operation comprises convolution and the mode of operation is selected from the group consisting of a scatter mode of operation and a gather mode of operation.

3. The method of claim 1, wherein the macro operation is selected from the group consisting of convolution and vector products.

4. The method of claim 3, wherein the macro operation comprises convolution, the first data set is a selected region of a selected feature map, and the second data set is a plurality of weights of a selected kernel.

5. The method of claim 3, wherein the macro operation comprises vector products, the first data set is a plurality of feature classification values, and the second data set is a plurality of weights for a feature classification layer of the neural network.

6. The method of claim 1, wherein the processing unit performs the macro operation in log domain.

7. The method of claim 1, wherein the mode of operation indicates a selected numerical precision from a plurality of different numerical precisions used by the processing unit in performing the macro operation.

8. The method of claim 7, wherein the macro operation applies a selected portion of each item in the second data set to the first data set based on the selected numerical precision.

9. An apparatus, comprising:
a control unit that receives a macro instruction;
wherein the macro instruction indicates a first data set, a second data set, a macro operation for a neural network, and a mode of operation for performing the macro operation, the second data set comprising a plurality of first items, and each first item comprising a value; and
a memory unit coupled to the control unit, the memory unit storing the first data set and the second data set; and
a processing unit coupled to the memory unit, the processing unit automatically initiating the macro operation by applying the second data set to the first data set based on the mode of operation and based on an order of execution sequence that includes applying first elements of the second data set to the first data set so that a value of a first element that is a same value as another first element is applied a single time to the first data set for the macro operation, wherein the control unit receives a second macro instruction indicating a second macro operation of applying an activation function to accumulated data and a second mode of operation indicating that the activation function is selected from a plurality of activation functions,
the processing unit further comprising:
an activation function unit that applies the activation function to the accumulated data.

10. The apparatus of claim 9, wherein the processing unit comprises:
an arithmetic accumulate array that performs convolution, wherein the mode of operation is selected from the group consisting of a scatter mode of operation and a gather mode of operation.

11. The apparatus of claim 9, wherein the processing unit comprises:
an arithmetic accumulate array that performs the macro operation, wherein the macro operation is selected from the group consisting of convolution and vector products.

12. The apparatus of claim 9, wherein the processing unit performs the macro operation in log domain.

13. The apparatus of claim 9, wherein the mode of operation indicates a selected numerical precision from a plurality of different numerical precisions for the processing unit used in performing the macro operation.

14. The apparatus of claim 13, wherein the macro operation applies a selected portion of each first item in the second data set to the first data set based on the selected numerical precision.

15. A computer-program product comprising a computer-readable storage medium having program code stored thereon, the program code executable by a processor to:
receive a macro instruction for implementing a neural network,
wherein the macro instruction indicates a first data set, a second data set, a macro operation for the neural network, and a mode of operation for performing the macro operation, the second data set comprising a plurality of first elements, and each first element comprising a value; and
automatically initiate the macro operation by applying the second data set to the first data set based on the mode of operation and on an order of execution sequence that includes applying first elements of the second data set to the first data set so that a value of a first element that is a same value as another first element is applied a single time to the first data set for the macro operation, and
further comprising receiving a second macro instruction that indicates a second macro operation of applying an activation function to accumulated data and a second mode of operation indicating that the activation function is selected from a plurality of activation functions.

16. The computer-program product of claim 15, wherein the macro operation comprises convolution and the mode of operation is selected from the group consisting of a scatter mode of operation and a gather mode of operation.

* * * * *